7216X

T. L. Jennison,

Preparing and Applying Fomentations,

Patented Aug. 30, 1832.

AM. PHOTO-LITHO. CO. N.Y. (OSBORNE'S PROCESS.)

7216X Aug. 30. 1832 12[illegible]

Timothy L. Jennison. Cambridge Massachusetts

Letters Patent.

The Schedule referred to in these Letters Patent and making
part of the same, containing a description in the words of the said Timothy
L. Jennison, of his improvement in the mode of preparing and applying
fomentations in sickness and surgery.

To all to whom these presents shall come.

Figure 1:
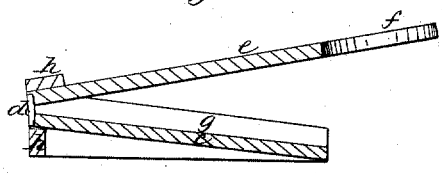
Figure 2:
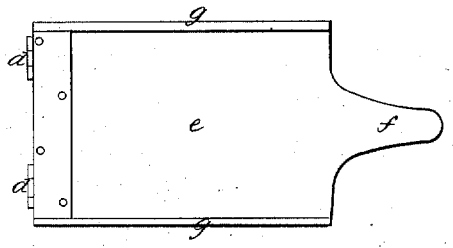
Figure 3:
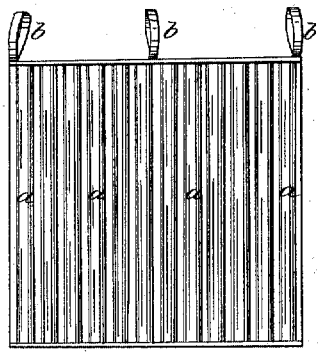
Figure 4:
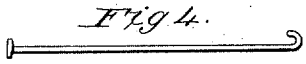

Be it known that I Timothy Lindall Jennison of Cambridge in
the County of Middlesex & State of Massachusetts Physician have in-
vented, constructed, made and applied to use, new & useful improvements
in the mode of preparing & applying fomentations in sickness & surgery
and that the following is a full & exact description of the construction &
operation of my invention ... consisting of a sweat Fig 3 made of silk,
Cotton, linnen or other suitable cloth, with circular cavities a. a. a. to
appended thereto – designed to include small pieces of sponge [illegible]
horse hair or appropriate aromatic herbs & other vegetable matters,
at the discretion of the physician, surgeon or nurse; as also a
stout tinned iron wire Fig. 4. of appropriate length, having a cir-
cular piece of Metal at one end, designed to fill up by the aid of a
funnel, with a suitable outlet said cavities; and a hook at the
other end for [illegible] or emptying the same ... said iron hook
is also designed & used for withdrawing the sweat from the
heated water and placing the same in the machine or compress
or Figs. 1 & 2 – Moreover the sweat herewith exhibited is formed
as follows: [illegible] of two yards or less of silk, linnen cotton or woolen
cloth half a yard wide spread on a table ... half a yard of it is then
to be covered with battons of lambs wool, it is then to be covered
cautiously by the next half yard of the cloth, & [illegible] with a needle
and strong thread from side to side at the [illegible] part of it.
The two sides are then to be bound with suitable binding. –

In

In the next place a circular stick of pine or other wood an inch
in diameter, of length equal to the width of the cloth, is to be laid on
the cloth, close to & parallel with the running: & the spare cloth to be
[illegible] smoothly over it (the stick) & pinned down at each
edge... The stick is then to be withdrawn & another running effected
from pin to pin, at the distance of one fourth or 5th part of an inch
from the last running, another is to be made parallel with it;
the stick is again to be laid down as before; & the same process
gone over, till all the space covered by the battens be taken up.
It deserves notice that the space designedly left between
each two runnings is purposely reserved for diffusing the
aqueous vapors of the <u>fetus</u>.... Two or three loops b.b.b. should
be firmly attached to one end of the battened part at proper distan-
ces for upholding the <u>[illegible]</u> while the cavities are filling or
evacuating. The Compressor Figs 1 & 2 is made of six pieces
of Mahogany or maple wood secured by two stout but hinges d.d.
& fourteen screws.... the bottom c is 12 inches wide & 18 inches
long & one inch thick. The upper part or lid c, is of the same
width & 25 inches in length inclusive of the handle f. Ledges
e.e. one third of an inch in thickness, three inches & a half
in width at the posterior part & two inches at the anterior, are
affixed by screws to the bottom c. so as to make it an inclined
plane for discharging all the waste water.... To prevent its warping
and add to its solidity cleats h.h. of one inch in thickness are to be
screwed on across the rear part of the top & bottom. ....

The manner of preparing aromatic baths & fomentations
during the past century, is well known to every nurse at the
hospitals & elsewhere... The menstruum or fluid part con-
taining such ingredients as the case of sickness or injury requi-
red, was heated and applied to the body or limb of the patient
by stuphs or pieces of soft woolen fabrick as hot and dry as
possible, <u>toties quoties</u>.... [illegible] not well be effected
by the hands only because of the intense heat of it.—

But

But strong coarse towelling of a yard in length once firmly [illegible]
round sticks longer than the width of the cloth was selected to com-
press said stuphes or woolen cloths sufficiently dry by the united
strength & labour of two strong assistants twisting in contrary di-
rections, while a third assistant was sometimes at hand to
place them where they were wanted on the patient.— This process
required some minutes hard service. On the contrary in-
stead of waiting for the collection of the herbs & making a strong
decoction of them beforehand, my improved mode consists
in having the aromatic ingredients primarily compressed
rather loosely into parallel cavities assigned them in my foveat
& as soon as the kettle of water is of sufficient heat the process
may be begun, by placing it in the sick room under the edge of a
firm table or bench; then dipping the foveat into the water by
means of the hook already mentioned withdraw it, and place
it in the compressor.— It is then instantly squeezed dry &
applied to the diseased part or wound of the patient.)

Now as moist heat long continued is highly requisite &
more advantageous if so applied without intervals of time it
becomes expedient that the foveat should not loose its heat.
This caloric therefore may readily be communicated
to the foveat in sufficient quantities by means of large
sponges wetted in the kettle then compressed & laid on the
foveat.— If the weight of the foveat & that of the sponges
should be too onerous or too hot, a remedy is easily provided
by propping them by pieces of whalebone or other substitute.
But generally the greater the torpor of the part, the more
intense heat will be endurable and desirable.—

Furthermore what I claim as my invention and
improvement, and what I consider as new is the whole
of the Apparatus as above described by me.—

In testimony that the above is a true
Specification of my said invention and improvement 126 7216x Aug 30, 1832

I have hereunto set my hand this sixteenth day of July in the year of our Lord, one thousand eight hundred and thirty two.

Witnesses
Robt. W. Eddy
John Foster

Jun.r L. Jennison

Rcd.
Mfd.

[485 wd]